(12) United States Patent
Ponnavaikko et al.

(10) Patent No.: US 11,100,467 B2
(45) Date of Patent: *Aug. 24, 2021

(54) SYSTEMS AND METHODS FOR AUTOMATIC PROCESSING OF FORMS USING AUGMENTED REALITY

(71) Applicant: Xerox Corporation, Norwalk, CT (US)

(72) Inventors: Kovendhan Ponnavaikko, Tamil Nadu (IN); Nischal Murthy Piratla, Fremont, CA (US); Sivasubramanian Kandaswamy, Tamil Nadu (IN); Anuradha Rukmangathan, Tamil Nadu (IN); Raja Srinivasan, Tamil Nadu (IN)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/857,469

(22) Filed: Apr. 24, 2020

(65) Prior Publication Data

US 2020/0320479 A1 Oct. 8, 2020

Related U.S. Application Data

(63) Continuation of application No. 13/733,171, filed on Jan. 3, 2013.

(51) Int. Cl.
*G06Q 10/10* (2012.01)
*G06K 9/00* (2006.01)
*H04M 15/00* (2006.01)

(52) U.S. Cl.
CPC ......... *G06Q 10/10* (2013.01); *G06K 9/00449* (2013.01); *H04M 15/44* (2013.01); *H04M 15/70* (2013.01); *H04M 15/721* (2013.01)

(58) Field of Classification Search
CPC ............. G06Q 20/042; G06Q 20/0425; G06Q 20/3223; G06Q 10/10
See application file for complete search history.

(56) References Cited

U.S. PATENT DOCUMENTS

| 6,021,397 A | 2/2000 | Jones et al. |
| 6,731,731 B1 | 5/2004 | Ueshima |

(Continued)

OTHER PUBLICATIONS

Hardawar, D., "Augmented Reality Expert Explains How AR Will Help Humanity," AOL Inc. www.engadget.com/2015/09/15/gaia-dempsey-ar/ pp. 1-6 (Sep. 15, 2015).

(Continued)

*Primary Examiner* — Aryan E Weisenfeld
(74) *Attorney, Agent, or Firm* — Jones Robb, PLLC

(57) ABSTRACT

The present disclosure discloses a method for automatic processing of forms using augmented reality. In an embodiment, a filled-out application form including one or more fields is scanned in augmented reality mode and its one or more images are captured. The captured images are used to identify the form type by comparing them with an original application form and to generate an electronic version of the form. Subsequently, filled-out content in the images is extracted and compared with a retrieved configuration file, which has a type same as the identified type of the filled-out application form. Based on this comparison, one or more messages are generated that are superimposed on the electronic version of the form in the augmented reality mode and that both are displayed.

20 Claims, 8 Drawing Sheets

(56) References Cited

U.S. PATENT DOCUMENTS

| | | | |
|---|---|---|---|
| 6,782,144 B2 | 8/2004 | Bellavita et al. | |
| 7,735,721 B1* | 6/2010 | Ma | G06Q 20/042 235/379 |
| 7,840,891 B1 | 11/2010 | Yu et al. | |
| 8,542,906 B1* | 9/2013 | Persson | G06Q 10/06 382/154 |
| 8,811,711 B2* | 8/2014 | Caiman | G06Q 20/042 382/138 |
| 2001/0042785 A1 | 11/2001 | Walker et al. | |
| 2002/0165877 A1* | 11/2002 | Malcolm | G06F 40/174 715/223 |
| 2003/0139994 A1 | 7/2003 | Jones | |
| 2004/0073868 A1 | 4/2004 | Easter et al. | |
| 2004/0117302 A1 | 6/2004 | Weichert et al. | |
| 2005/0268217 A1 | 12/2005 | Garrison | |
| 2006/0242063 A1 | 10/2006 | Peterson et al. | |
| 2007/0168382 A1 | 7/2007 | Tillberg et al. | |
| 2008/0181501 A1 | 7/2008 | Faraboschi et al. | |
| 2009/0097077 A1 | 4/2009 | Swartz et al. | |
| 2009/0106271 A1 | 4/2009 | Chieu et al. | |
| 2009/0138284 A1 | 5/2009 | Guadagna et al. | |
| 2009/0219567 A1 | 9/2009 | Ishizaki | |
| 2009/0296995 A1 | 12/2009 | Shibuya | |
| 2011/0047389 A1 | 2/2011 | Ginter et al. | |
| 2011/0200256 A1 | 8/2011 | Saubat et al. | |
| 2013/0198072 A1 | 8/2013 | Piratla et al. | |
| 2013/0304773 A1 | 11/2013 | Ponnavaikko et al. | |
| 2014/0029046 A1 | 1/2014 | Ponnavaikko et al. | |
| 2014/0040717 A1 | 2/2014 | Piratla et al. | |
| 2014/0188756 A1 | 7/2014 | Ponnavaikko et al. | |

OTHER PUBLICATIONS

Pachal, P., "See Elon Musk's Real-Life 'Iron Man' Lab," Video on Mashable mashable.com/2013/09/06/elon-musk-iron-man-lab#rodLwz|6i5kY pp. 1-7 (Sep. 6, 2013).

Widder, B., "Best Augmented Reality Apps | Digital Trends," www.digitaltrends.com/android/best-augmented-reality-apps/ pp. 1-9 (Mar. 14, 2014).

\* cited by examiner

ORIGINAL APPLICATION FORM PAGE 1

FIG. 2A

ORIGINAL APPLICATION FORM PAGE 2

FIG. 2B

FILLED-OUT CONTENT

FIG. 2C

EXTRACTED FILLED-OUT CONTENT

FIG. 2D

EXEMPLARY CONFIGURATION FILE

FIG. 3

SYSTEMS AND METHODS FOR AUTOMATIC PROCESSING OF FORMS USING AUGMENTED REALITY

CROSS-REFERENCE TO RELATED APPLICATION(S)

This patent application is a continuation of U.S. patent application Ser. No. 13/733,171, filed on Jan. 3, 2013, the disclosure of which relates to U.S. patent application Ser. No. 13/359,510, filed Jan. 27, 2012, and Ser. No. 13/559,630, filed Jul. 27, 2012, all of which are incorporated by reference herein in their entireties.

TECHNICAL FIELD

The presently disclosed embodiments generally relate to application forms for various business services, and more particularly, to systems and methods for automatically validating application forms.

BACKGROUND

Business services, such as banking, telecom or postal play a significant role in the day-to-day life of individuals. To access these services, customers typically provide information using one or more application forms, which may vary from service-to-service. For example, if a customer wishes to open-up a new bank account, the customer provides information on an account opening form. Similarly, a customer may complete a loan application form if applying for a loan.

In order to subscribe for banking services, a customer may need to provide information on an application form, usually at a bank branch, and submit the completed or partially completed form to a bank representative. The branch representative then typically manually checks the application form to verify whether the application form is filled-out completely and correctly. Based on this document review, the customer may need to correct errors or provide additional information so that the application is sufficiently completed. Thereafter, the bank representative typically again verifies the application form focusing on the corrected entries. Subsequently, the application form is forward, for example, by courier to a central location or back-office for further verification and processing. At the back-office, the forms undergo a complete verification, including checking supporting documents, such as a PAN (Personal Account Number) card, driver's license, or the like. If the forms are found to be incomplete or if the supporting documents are unavailable, the forms are returned to the customer in order to obtain the missing information or documents. This process continues until the application form is appropriately or sufficiently complete along with the supporting documents.

The above approach may involve significant manual effort in reviewing the forms, thereby unnecessarily increasing form processing time. In one scenario, a bank representative, who is visiting a customer intending to open a new bank account, is unable to check the completeness and correctness of an application form filled-out by the customer at the customer's location. Thus, the bank representative sends the application form to the back-office for processing the form. This results in increased operational cost as well as reduced customer satisfaction. Accordingly, a significant cost, both in terms of time and resources, is spent on checking forms completed at the customer's location and at the back-office.

It may, therefore, be advantageous to enhance the efficiency of the above process for processing forms.

SUMMARY

The present disclosure discloses a system for automatic processing of application forms that include one or more fields. In an embodiment, the system includes an imaging unit, processing unit, and a user interface. The imaging unit is configured to scan at least a portion of the filled-out application form in augmented reality mode and capture one or more images based on this scanning. The processing unit is configured to compare the captured images with an original application form for identifying a type of the filled-out application form. The processing unit is also configured to generate an electronic version of the filled-out application form using the captured one or more images. Further, the processing unit extracts the filled-out content in the fields of the captured one or more images and retrieves a configuration file based on the identified type of filled-out application form. The configuration file includes rules and threshold values for each of the fields in the application form. Subsequently, the extracted content is compared with at least one of the rules and the threshold values in the configuration file to generate one or more messages. The user interface is configured to display either the generated messages only or the electronic version of the filled-out application form superimposed with these generated messages in the augmented reality mode.

Other and further aspects and features of the disclosure will be evident from reading the following detailed description of the embodiments, which are intended to illustrate, not limit, the present disclosure.

BRIEF DESCRIPTION OF THE DRAWINGS

Figure 2A:
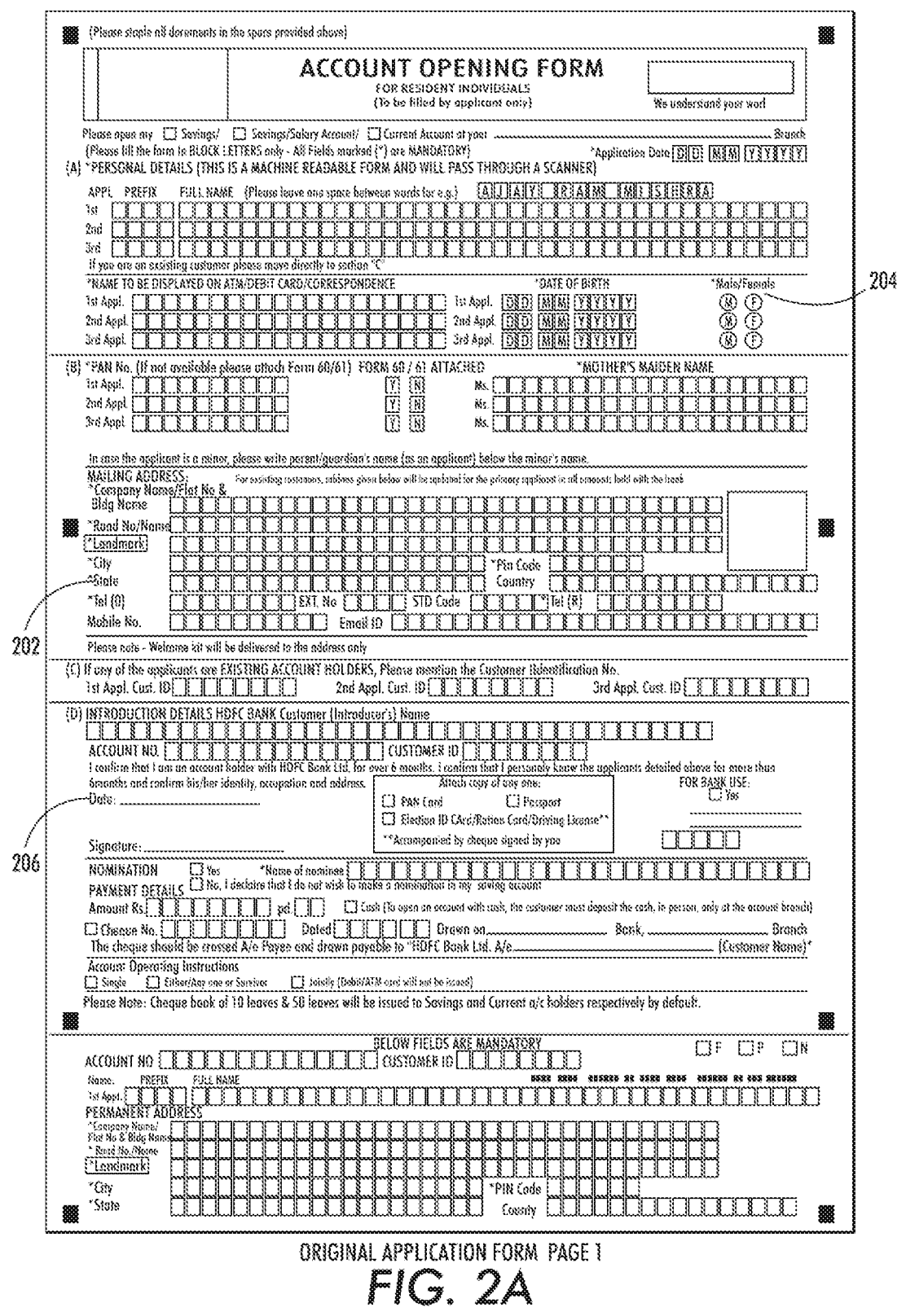
Figure 2B:
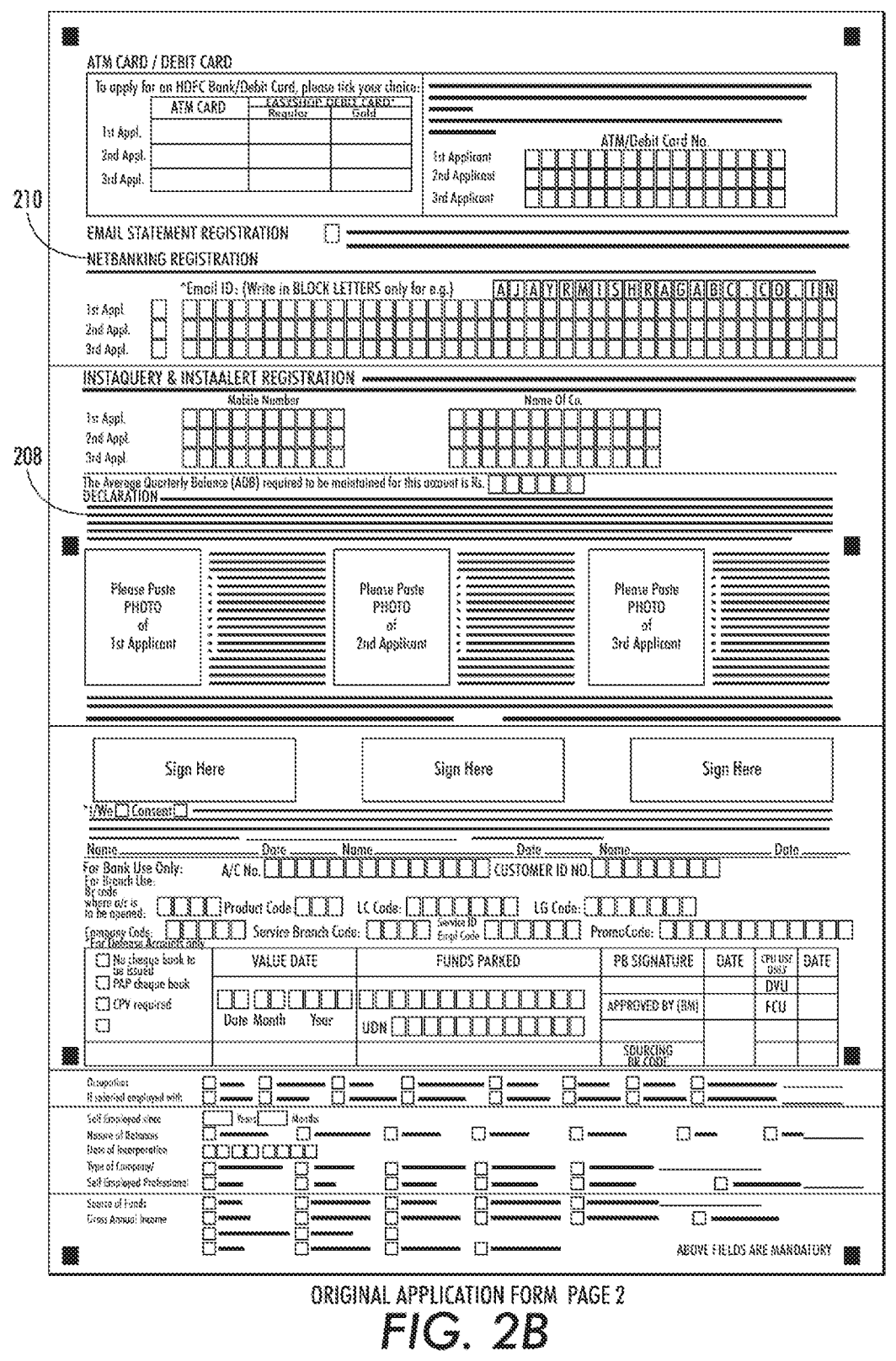
Figure 2C:
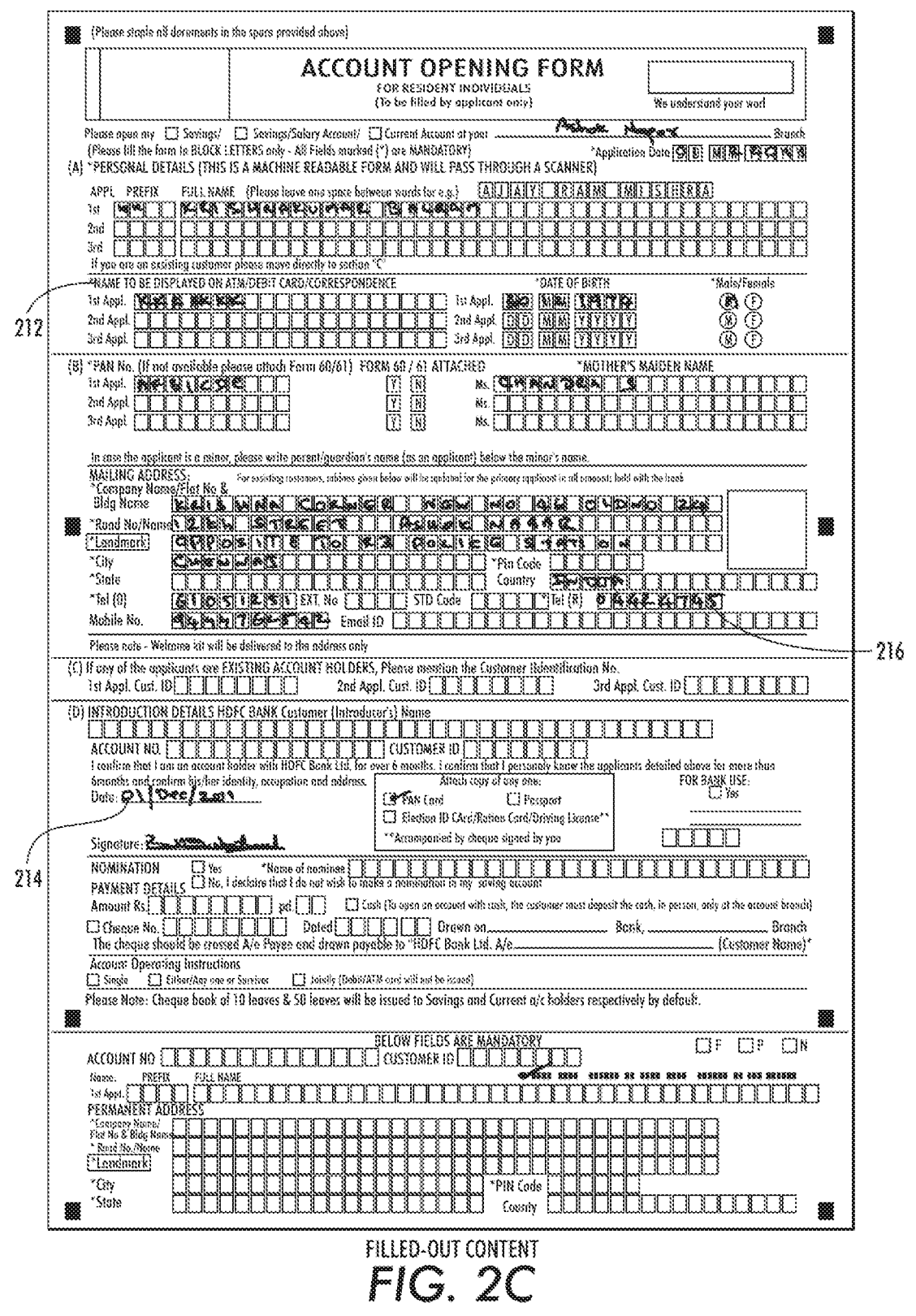

FIGS. 2A-2B, 2C, and 2D illustrate examples of an original application form, a filled-out form, and extracted filled-out content, respectively, according to one embodiment of the disclosed subject matter.

Figure 3:
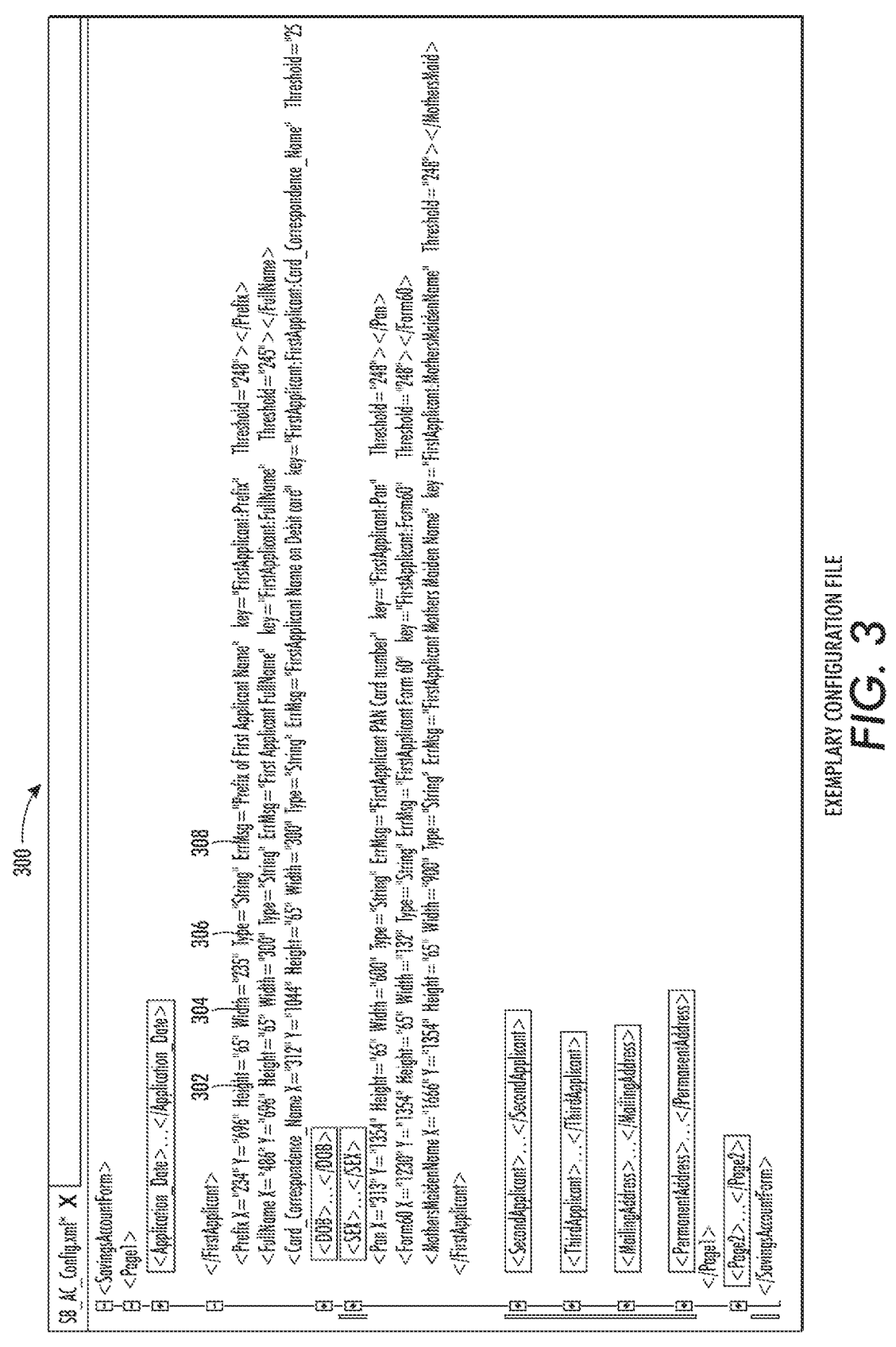

FIG. 3 is an exemplary configuration file according to the disclosed subject matter.

DETAILED DESCRIPTION

Figure 1A:
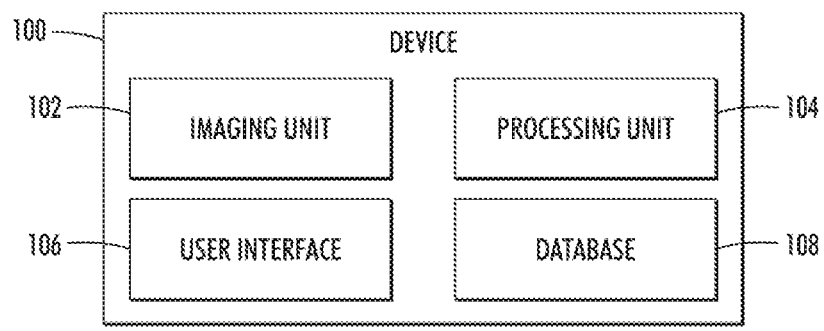
FIG. 1A illustrates an exemplary device for automatic processing of application forms in accordance with an embodiment of the disclosed subject matter.

The following detailed description is made with reference to the figures. Exemplary and in some cases preferred embodiments are described to illustrate the disclosure, not to limit its scope, which is defined by the claims. Those of ordinary skill in the art will recognize a number of equivalent variations in the description that follows.

Definitions:

In various embodiments of the present disclosure, definitions of one or more terms that will be used in the document are described below. The disclosure includes a device that facilitates the automation of various types of operations usually performed in a business center, such as bank branch, telecom center, postal office, or the like. However, not all embodiments focus on the above contexts, and in fact, some embodiments are applied in contexts that are unrelated to the above. One exemplary device automates the processing of an application form at the customer's location. As is discussed in detail below, the device performs automation by executing a number of steps. These steps include scanning and capturing of a filled-out or partially filled out application form in augmented reality mode, extraction of the filled out content, analysis of the extracted content and form fields, and displaying messages based on this analysis using augmented reality. Augmented reality refers to the technology that superimposes computer-generated information, such as images, text, etc., on a user's view of the real world to provide a composite view in real time.

The numerous references in the disclosure to filled out forms are intended to cover any and/or all data provided on or otherwise input onto any document relevant to the applicable context, regardless of whether or not the same or the date is provided. Thus, the following references to filled-out application forms cover forms that are filled out completely, as well as forms that are only partially completed. Furthermore, the device may be capable of receiving and displaying an electronic version of an application form.

Overview:

Some of the disclosed embodiments relate to handling application forms for various business services, such as banking, telecom, or postal services, which may use different application forms. For example, banking services have forms relating to opening a new account, changing personal information, applying for a loan and so forth. Similarly, the application forms for telecom services may include buying a new connection, for example. Some embodiments of the disclosure automate processing of information filled-out on application forms at a location of a customer, and thus, this disclosure describes a device for processing the application forms using augmented reality at the customer end. More particularly, the device utilizes a configuration file to determine the completeness or correctness of application forms. The configuration file can include one or more rules and threshold values, based on which the device can verify the completeness or correctness of the application forms. Subsequently, the device can display one or more messages over an electronic version of the filled-out application form on a user-interface using augmented reality. Based on the displayed messages, a user can modify the 'physical' filled-out application form or an electronic version of the application form. Alternatively, the user can choose to ignore the messages.

Exemplary Embodiment:

FIG. 1A illustrates an exemplary device for automatic processing of application forms using augmented reality, according to the disclosure. The device 100 may be a portable device configured to perform a number of operations, which are performed in a business center or bank branch. Examples of the device 100 include, but are not limited to, a mobile phone, a scanner, a laptop, and a personal electronic assistant (PDA). According to one example, the device 100 may perform functions, without limitation, related to sending or receiving electronic version of application forms (hereinafter referred to as electronic application forms) and scanning of the physical application forms. The device 100 may allow a user to perform additional activities including paying bills, viewing account summary, viewing statements, viewing branch reports, uploading documents, downloading documents, and so on; however these extraneous functions do not need to be necessarily related to other aspects of the present disclosure, and in fact can be completely unrelated to the rest of the disclosure. For simplicity, this disclosure is described in the context of device 100 shown in FIG. 1A, however, embodiments are intended to cover or otherwise include other types and/or combinations of multiple portable devices, such as a camera and a scanner.

In one embodiment, the device 100 may be configured to operate in two modes, namely, a normal mode and an augmented reality mode. Unlike the normal mode, the device 100 can combine computer-generated information, such as annotations, messages, emoticons, etc., with received real-world data such as images, video, etc. to provide a composite view in the augmented reality mode. One of skill in the art will understand the concepts of augmented reality along with its implementation on the device 100. The device 100 can be, for e.g., a mobile phone (see FIG. 1C) having an imaging unit 102, a processing unit 104, a user interface 106, and a database 108. These components 102, 104, 106, and 108 communicate with each other, or may be configured to communicate with a computing device at another location, such as a back-office, over a network (not shown) using a variety of communication protocols, including related art, known, or even later developed methods and systems. It should be understood that the device 100 can also be any electronic device having the components 102, 104, 106 and 108, and is not limited to a mobile phone.

The imaging unit 102 may include a variety of components, such as a camera, microcontroller, etc., which are switched to operate in the augmented reality mode. In this mode, the imaging unit 102 may scan, e.g., a video scan, a physical filled-out application form including multiple fields, which may be filled-out. This scanning can capture one or more images of the filled-out application form, when, for e.g., the imaging unit 102 is triggered by a user or automatically while scanning as configured. These captured images may be a collection of scanned images of portions of the filled-out application form and/or the entire filled-out application form. One of skill in the art will understand that, for some embodiments, the filled-out application form has to be located at a reasonable distance from a scanning lens of the imaging unit 102 depending on factors, such as, focal length and resolution of the imaging unit 102, for capturing at least a standard quality image of the filled-out application form.

Further, the imaging unit 102 may include a focus zone for capturing images of the scanned application form. According to one example, the focus zone may be a pre-defined boundary on a portion of scanning lens (not shown) of the imaging unit 102, such that the imaging unit 102 captures a part of the filled-out application form when positioned within this pre-defined boundary. Alternatively, the complete scanning lens may operate as the focus zone of the imaging unit 102. This focus zone may be further used for identifying a type of the filled-out application form, as discussed below.

Still further, the processing unit 104 may be configured to identify a type of the filled-out application form by comparing the captured images of the application form (hereinafter referred to as captured application form) against an original application form. Once the form type is determined, the processing unit 104 may generate an electronic version of the filled-out application form (hereinafter referred to as electronic application form) using the captured application form. Then, the processing unit 104 extracts the filled-out content in each of the fields of the captured application form and retrieves a configuration file based on the identified type of the captured application form. The configuration file includes distinct rules and threshold values for each field of the captured application form in order to process the filled-out application form, discussed below in detail. For this task, the processing unit 104 compares the extracted content with the respective rules and threshold values defined in the retrieved corresponding configuration file to generate messages. These generated messages are displayed on the user interface 106.

The user interface 106, e.g., a display screen, may be configured to display the generated messages or the electronic application form. In one embodiment, the user interface 106 may be configured to display the messages over the electronic application form, while the device is operating in the augmented reality mode. Different types of user interfaces, including those, which are touch controlled, key-controlled, joystick-controlled, motion-controlled, voice-controlled, and so on may be employed. The user interface 106 may be either integrated or separately combined with the device 100.

Further, the device 100 can any type of database 108, such as a relational database management system (RDMS), or other known types of storage devices, such as EEPROM, flash memory, cache memory, SD-RAM, and DDR-RAM, or other known types of storage devices. In the above embodiment, the database 108 may store a variety of data such as a blank original application form, configuration files, log files, etc.

Figure 1B:
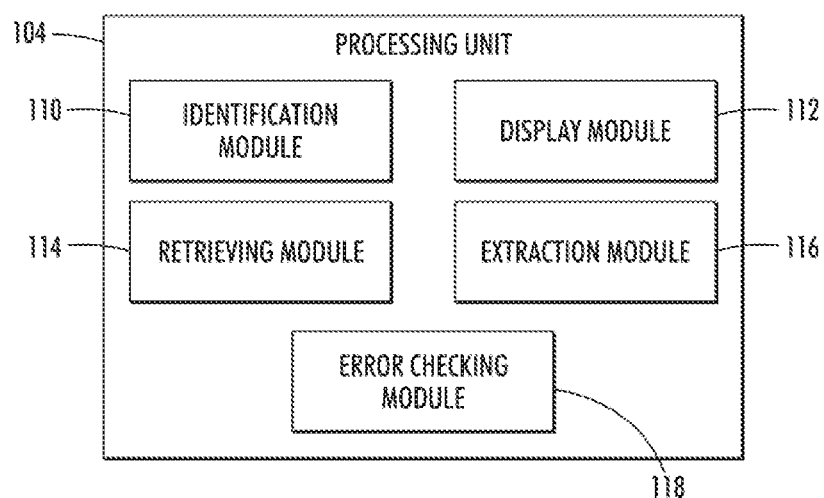
FIG. 1B illustrates an exemplary processing unit of the device of FIG. 1A in accordance with an embodiment of the disclosed subject matter.
Figure 1C:
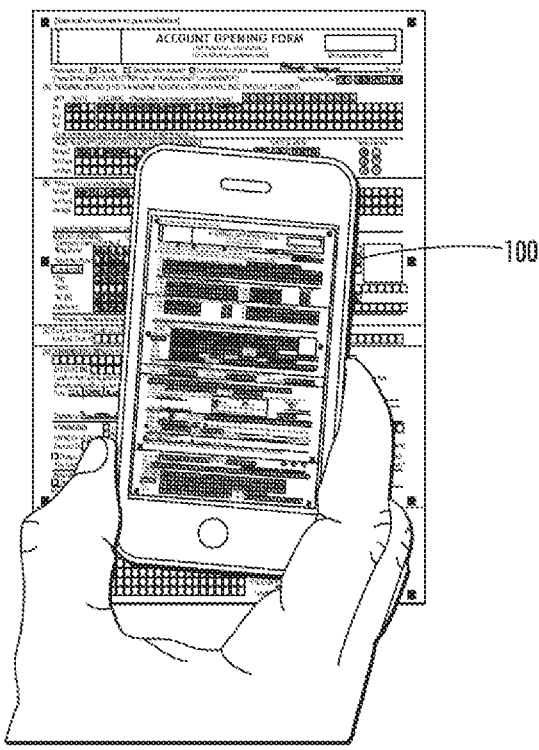
FIG. 1C illustrates scanning of an application form using the exemplary device of FIG. 1A.

FIG. 1B illustrates an exemplary processing unit 104 of the device of FIG. 1A, according to the disclosure. In one embodiment, the processing unit 104 includes an identification module 110, a display module 112, a retrieving module 114, an extraction module 116, and an error-checking module 118. The identification module 110 may be configured to identify a type of the filled-out application form. For this task, the identification module 110 parses and compares background information in the captured application form against an original application form stored in the database 108. The background information refers to any data including, but not limited to a logo, an application form number, a barcode, and a field header, for example, which are available on the captured application form except the filled-out content in the fields of the captured application form.

One of skill in the art will understand that, if multiple original application forms of different types are stored in the database 108, then the identification module 110 will compare background information of the captured application form against those in each of the original application forms for a best match, which indicates the type of the filled-out application form. Upon finding a best match, the identification module 110 may retrieve the type information, which may be stored as metadata with the corresponding original application form. The identification module 110 may be further identifying mandatory fields and optional fields in the captured application form based on the above comparison for extraction of the filled-out content, discussed below. In some embodiments, the identification module 110 may receive the application form type from a user via the user interface 106.

Once the type of filled-out application form is identified, the display module 112 may be configured to generate an electronic version of the entire filled-out application form using the captured images of the filled-out application form. This electronic version of the filled-out application form (hereinafter referred to as electronic application form) will include the content originally filled-out in the corresponding physical filled-out application form. Subsequently, the generated electronic application form is displayed on the user interface 106. In some embodiments, the display module 112 may generate this electronic version as editable (hereinafter referred to as editable application form). This editable application form may allow a user to edit the filled-out content via, e.g., user interfaces such as the user-interface 106.

Further, the retrieving module 114 may be configured to retrieve a configuration file from the database 108 based on the identified type of the filled-out application form. The configuration file includes threshold values and rules for each field of the captured application form. In one embodiment, the retrieving module 114 may feed the retrieved configuration file to the extraction module 116.

The extraction module 116 may be configured to separate the background information from the captured application form and extract only the content filled-out in the mandatory fields of the captured application form. For this task, the extraction module 116 may subtract the original application form from the captured application form of the type that is the same as that of the original application form. The extracted content is verified by the error-checking module 118 for completeness and correctness.

Figure 1D:
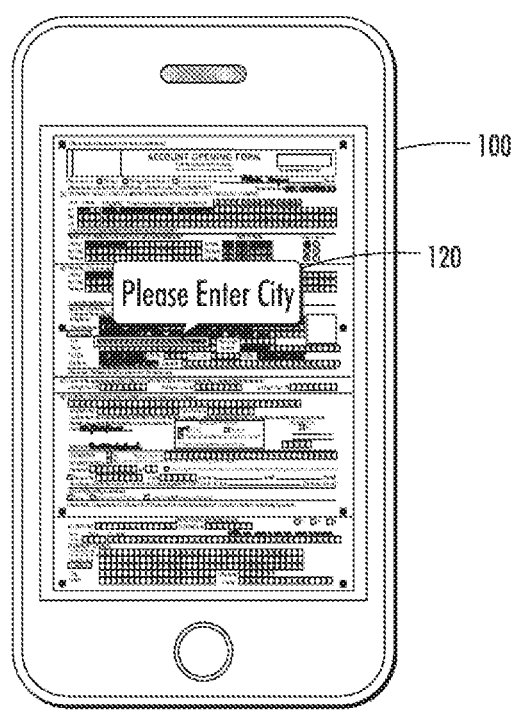
FIG. 1D illustrates messages displayed on the exemplary device of FIG. 1A.

The error-checking module 118 may be configured to calculate the average intensity, e.g., average optical intensity, of the extracted content, which was filled-out in any of the fields, and compare the extracted content with the corresponding threshold values stored in the configuration file. According to one example, when a value of '255' represents a blank or an all white field, and '0' depicts an all black field, if the intensity of the extracted content is above a threshold value, such as '150', then the error-checking module 118 may consider the filled-out content as complete as opposed to incomplete. According to the illustrated example of FIG. 1D, when the mandatory field 'City' is empty and the average intensity of the field is below the threshold value, such as '150', then the error-checking module 118 generates an error message 120 over the electronic application form in the augmented reality mode.

Further, the error-checking module 118 may be configured to determine the correctness of the filled-out application form. For this task, the error-checking module 118 may apply one or more rules predefined in the configuration file to the content filled-out in the captured application form. For example, the error-checking module 118 may apply a rule to determine whether the checkboxes for "Married" and "Unmarried" are both filled-out. If both the checkboxes are filled-out, this means that the content is filled-out incorrectly. In such a scenario, the error-checking module 118 generates a robust error message, which may indicate that the user should or needs to fill-out a new 'physical' application form and repeat the entire process as discussed above.

Another example of a rule that may be defined is "If there is more than one applicant, then there must be more than one full name". If the rule violated, then the error-checking module 118 may again generate an error message. These error messages are displayed on the user interface 106 superimposed on the electronic application form against the field for which the error message has been generated, provided the device 100 is operating in the augmented reality mode (shown in FIG. 1D). Alternatively, only the error messages may be displayed without displaying the electronic application form.

Based on these error messages, the user may determine whether the filled-out content of the captured application form should be modified or the messages should be ignored. For this task, the user interface 106 may be configured to allow the user to modify the content of the electronic application form. For instance, if the error-checking module 118 prompts the user with an error message indicating that the field "Date of Birth" is missing, then the user may fill-out the field on the same physical copy of the filled-out application form or a new physical copy of the application form, and re-scan the filled-out application form for processing. Alternatively, the user may fill-out the field 'Date of Birth' in the editable application form displayed on the user interface 106 and conduct a re-check for completeness and correctness on this editable application form.

The iteration of the captured application form from the identification module 110 to the error-checking module 118 may be repeated until the filled-out application form meets the criteria defined in the configuration file. These criteria refer to the completeness and correctness of the mandatory fields in the filled-out application form as required by, or otherwise helpful to, a business service provider. Once the data processing unit 104 has completed the checking of the captured application form, a log file along with the corrected filled-out content from each field (i.e., in case of electronic application form) may be stored within the database 108. The log file may be used as a reference to verify and ensure the correctness and completeness of the filled-out application form, whenever helpful or required. In some embodiments, the log file may be sent over to a distant location, such as a back office, via a network and a network module (not shown), which may be included in the device 100, for a variety of operations, such as re-checking of the filled-out application forms, data entry operations, third party validations, etc. Examples of applicable networks include, but not limited to, Local Area Network (LAN), Wide Area Network (WAN), a Metropolitan Area Network (MAN), Wireless LAN, and so on.

Exemplary Application Forms:

FIGS. 2A-2B illustrate a 2-page original, blank application form. In general, the application form includes various fields, such as, "First Name", "Last Name", "Age", "Permanent Address", "Date of Birth", "Contact Number", or "Email Id". Some of the fields such as, "State", "Male/Female", "Date", "Net Banking Registration", "Declaration" are marked as 202, 204, 206, 210, and 208, respectively, in FIGS. 2A-2B. These fields constitute background information relating to a customer and blank versions of these forms are stored in the database 108 of the device 100. A form filled-out by a customer is shown in FIG. 2C, and some of the filled-out fields are "Name" 212, "Date" 214, and "Telephone" 216.

Figure 2D:
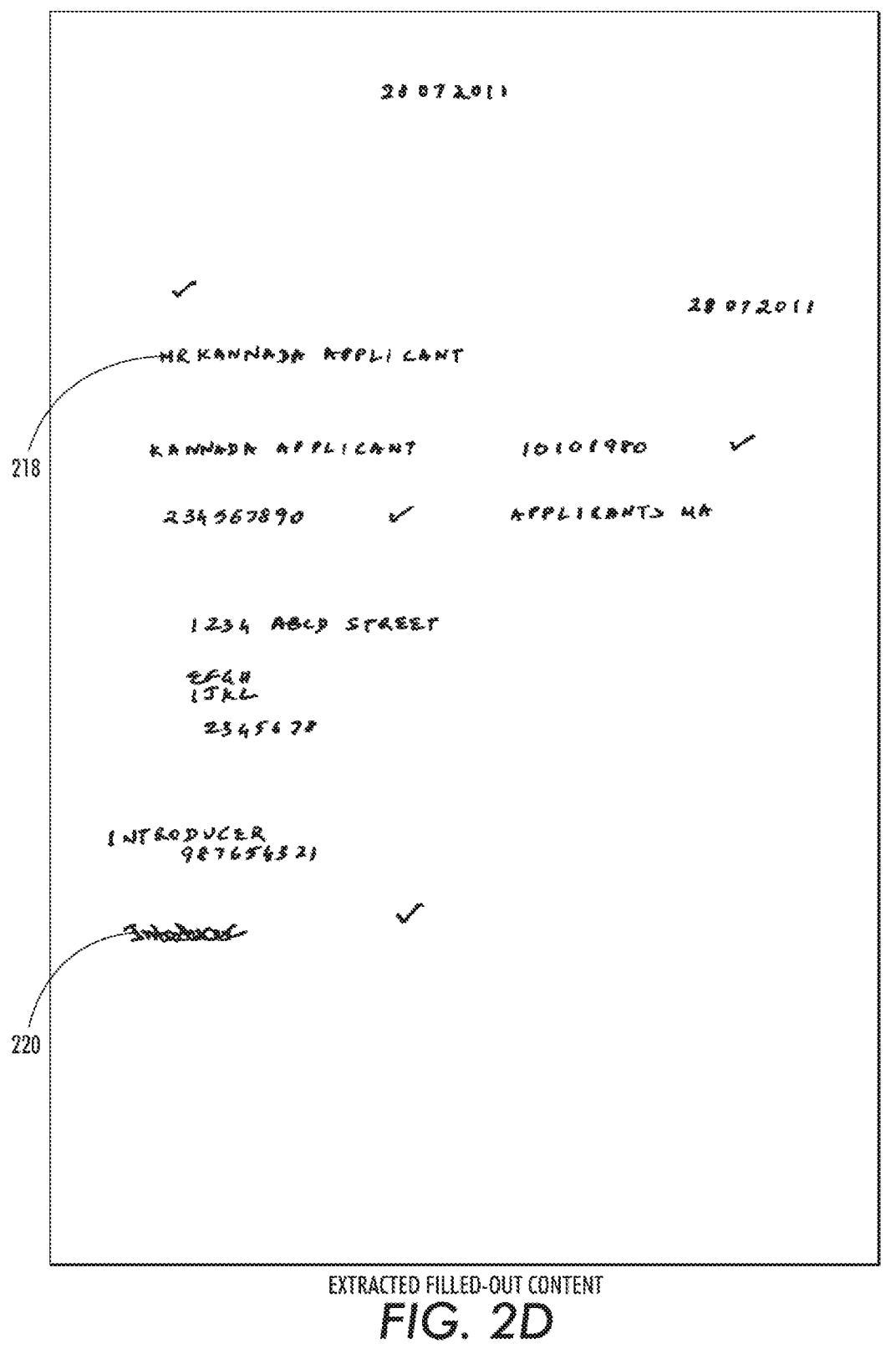

Referring to FIG. 2D, the filled-out content may be extracted by the device 100, which is illustrated as extracted content 218 and 220. The blank application form (in FIGS. 2A-2B), filled-out application form (in FIG. 2C), and extracted content (in FIG. 2D) are merely provided for exemplary purposes, and are not intended to limit the scope of the disclosure in any way.

Exemplary Configuration File:

For each type of application form, a corresponding configuration file may be pre-defined in any known format, such as XML (EXtensible Markup Language) as illustrated in the embodiment of FIG. 3, or alternately in any other related art or later developed format. The configuration file may be a metadata file that stores all fields of an application form, along with related attributes, such as name, number of characters allowed for the field, and so on. Given a new filled-out application form, information about different fields is extracted and stored in the form of an XML document in the database 108. One such exemplary file 300 is shown in FIG. 3. The configuration file 300 may include various attributes, threshold values, or rules for each field in the form, and can be maintained in a pre-defined representation. For example, the "First Applicant" field in the application form may be denoted by <FullName> within the <FirstApplicant> tag in the configuration file 300. The <FirstApplicant> tag may further have child tags pertaining to "Date of Birth", "Gender", "PAN", or the like. The child tags denote the details related to the "First Applicant".

In one example, the attributes may include, but are not limited to, "X", "Y", "height", "width", "type", "errmsg", "key", and "threshold". Some of these attributes including "height", "width", "type", "errmsg" are marked as 302, 304, 306, and 308 respectively. Herein, "X", "Y" are the starting and ending positions of a field in an unfilled application form. The attributes "height" and "width" represent the height and width values of the particular field in the unfilled application form. The "type" attribute may define the data type of the field. For example, the field "Full Name" is a string type, while the field "Phone Number" is a number data type. Moreover, the field "Address" may be alphanumeric.

The attribute "ErrMsg" refers to an error message to be displayed in the case of an incorrect or incomplete entry against any field in the filled-out application form. The error message may be prompted when a validation error is captured while processing the filled-out application form. "Key" here represents a unique identity for the definition tag. Additionally, "threshold" represents the average pixel intensity for a particular field and is used as one of the criteria to determine the completeness check of the content. The "threshold" values may range from '0' to '255'; the value '0' here represents all black pixels, while '255' indicates all white pixels. Alternatively, the value '0' may denote all white pixels, and '255' may represent all black pixels. In the present embodiment, the threshold '245', for example, means that at least 4% of the box must have black pixels for the field to be considered filled. If the content intensity level is less than the threshold value, for e.g., '245', i.e., the number of black pixels do not exceed the threshold value, the field is considered to be filled-out not filled. Other attributes may be based on, but are not limited to, whether a particular field is mandatory, mutually exclusive to another field, optional, and so on.

Further, the configuration file 300 includes one or more rules to determine the correctness of the field in the form. In one example, the rule may be that the check boxes for married or unmarried cannot both be filled-out. The configuration file 300 also stores relationship data between different fields. An example for a relationship between fields is that, if a 'Second Applicant Name' has been provided, then details associated with the second applicant, such as 'Second Application Address', 'PAN Card Number', etc., must also be provided.

The configuration file 300 varies with the type of application form. For example, the configuration file 300 for "Savings Account Form" may be different from the configuration file 300 for the "Loan Application Form", accordingly, the attributes or threshold values may differ. The configuration file 300 may thus be customized to satisfy or otherwise address factors or requirements.

Figure 4:
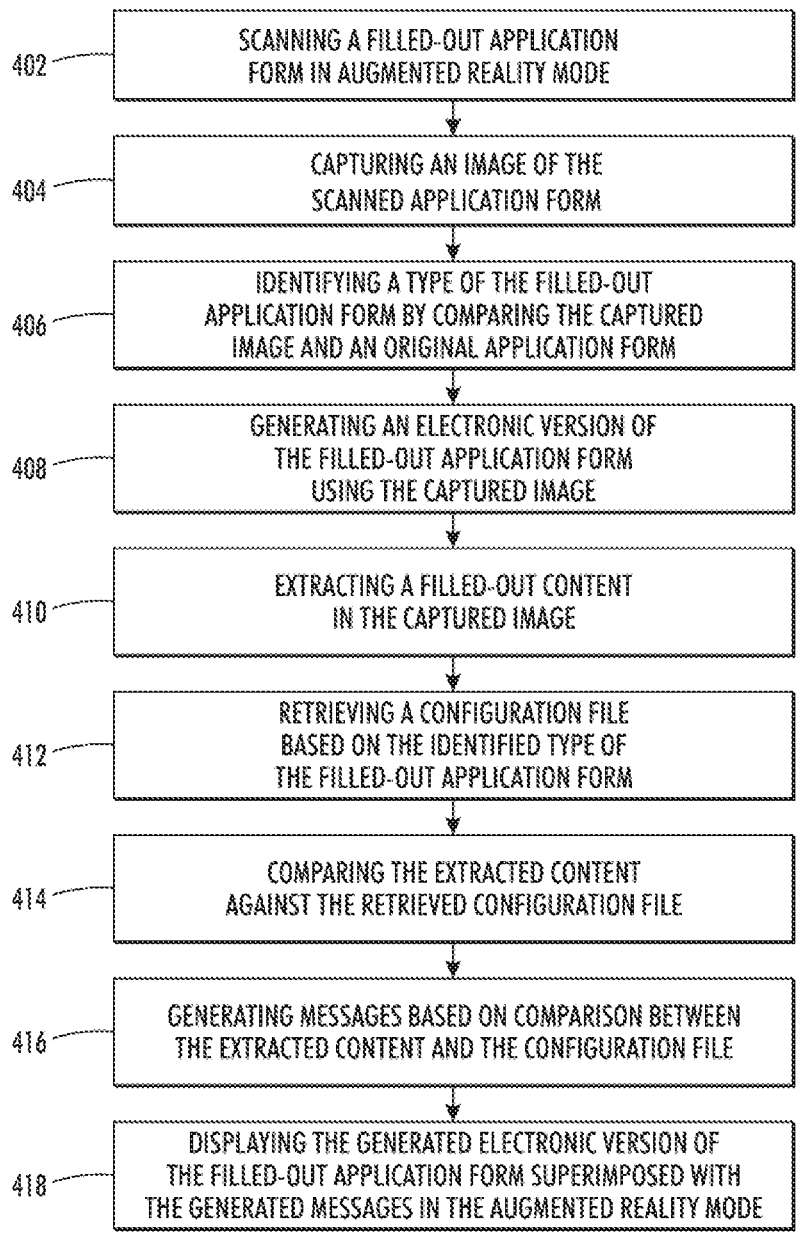
FIG. 4 is a flowchart of an exemplary method for automatic processing of application forms in accordance with the disclosed subject matter.

FIG. 4 illustrates a method for automatic processing of application forms using augmented reality, according to the disclosure. These exemplary methods may be described in the general context of computer executable instructions. Generally, computer executable instructions can include routines, programs, objects, components, data structures, procedures, modules, functions, and the like that perform particular functions or implement particular abstract data types. The computer executable instructions can be stored on a computer readable medium, and loaded or embedded in an appropriate device for execution.

The order in which the method is described is not intended to be construed as a limitation, and any number of the described method blocks can be combined or otherwise performed in any order to implement the method, or an alternate method. Additionally, individual blocks may be deleted from the method without departing from the spirit and scope of the subject matter described herein. Furthermore, the method can be implemented in any suitable hardware, software, firmware, or combination thereof, that exists in the related art or that is later developed.

The method describes, without limitation, implementation of the exemplary device 100 in a banking services scenario. One of skill in the art will understand that the method may be modified appropriately for implementation in a variety of business service scenarios including those related to telecom, postal services, and so on, without departing from the scope and spirit of the disclosure.

At step 402, a filled-out application form is scanned into the augmented reality mode. In the case of banking services, a customer may fill-out an application form for opening a new bank account. In this example, a bank representative may scan the filled-out application form at the customer site using the device 100 configured to operate in augmented reality mode. For this task, the device 100 may include the imaging unit 102, which the bank representative can hover over, or otherwise communicate with, the application form to scan various portions of filled-out application form while the device 100 is operating in the augmented reality mode.

At step 404, an image of the filled-out application form is captured. While scanning, either the device 100 automatically, or the bank representative can manually, capture multiple images of the filled-out application form. The captured images of the filled-out application form (i.e., the captured application form) are subjected to automatic processing for correctness and completeness.

At step 406, a type of the filled-out application form is identified. The background information available in the captured application form is compared with that in one or more original application forms, which may be blank and stored in the database 108. Upon having a best match with one of the original application forms based on such comparison, the type of the filled-out application form is determined. According to an example, the type formation may be stored in metadata of the original application forms and retrieved for form identification based upon the best match. Additionally, mandatory and optional fields in the captured application form may be identified based on this comparison.

At step 408, an electronic version of the captured application form (i.e., electronic application form) is generated. The display module 112 in the processing unit 104 generates the electronic application form by using the captured application form. The electronic application form includes the originally filled-out content recorded in the captured application form. In some embodiments, the generated electronic application form may be made to be editable such that a user can modify the originally filled-out content.

At step 410, the filled-out content in the captured application form is extracted. The filled-out content is extracted by subtracting the original application form, which is blank, from the captured application form. This original application form is the one previously identified to have the same type as that of the captured application form and is stored in the database 108.

At step 412, a configuration file is retrieved based on the identified type of the filled-out application form. Based on identified type of the captured application form, a configuration file, such as the configuration file 300, is retrieved from the database 108. The configuration file includes rules and threshold values for each field of the captured application form.

At step 414, the extracted filled-out content is compared with the configuration file. The extracted filled-out content from the captured application form may be compared with the rules and threshold values defined in the configuration file. According to one example, in order to check for completeness of a field, the average optical intensity of the extracted filled-out content can be compared with the corresponding threshold value defined for that field. If the intensity is above the threshold value, then the field is indicated as complete, or else it is indicated as incomplete. Similarly, in order to check for correctness, a rule may be applied to a field. For example, a rule defined as "Gender can be only male or female" may be applied to a field 'Gender'. If the average intensity of the filled-out content in the field 'Gender' is less than a respective range of threshold values for 'male' or 'female', the field 'Gender' is identified as incorrect, or else it is indicated as correct.

At step 416, one or more messages based on the comparison between the extracted filled-out content and the configuration file is generated. If there is a discrepancy between the filled-out content of a field and the corresponding rule and threshold value for that field, then the device 100 may generate an error message for indicating to the customer whether the filled-out content is complete and correct. Additionally, the device 100 may generate suggestions on how to complete or correct a particular field or the filled-out content.

At step 418, the generated electronic version of the captured application form, along with the generated one or more messages, are displayed in the augmented reality mode. When the device 100 is operating in the augmented reality mode, the generated one or more messages, suggestions, etc. are superimposed on the electronic application form, both of which are displayed on the user interface 106. In some embodiments, the messages may be superimposed on the electronic application form, which is editable (editable application form). Based on the displayed messages, the customer may choose to complete and correct the physical filled-out application form or the editable application form; or simply, ignore the messages.

The present disclosure is provided in the context of methods and systems for automatic processing of forms using augmented reality. Some of the disclosed embodiments reduce the the manual effort required for checking the forms at the customer's end and thus reduces overall processing time. Some of the disclosed devices help the customer identify errors and facilitate correction of those errors. More specifically, the device may allow direct communication with the customer about the fields that are not filled-out correctly or completely. Further, the device may give control to the customer by providing options to fix entries based on error messages or ignore these error messages. Moreover, the device may maintain a log file that contains actions taken by the customer as well as error messages, which may expedite a completeness check at the customer end or at a distant location, such as at the back office.

What is claimed is:

1. A system for facilitating completion of an application form, the system comprising:
   a processing unit configured to:
   receive an image of an incomplete application form,
   identify an application form type of the incomplete application form,
   generate an electronic version of the incomplete application form using the image, one or more fields of the electronic version configured to be edited by a user,
   access a configuration file for the application form type that stores information about the one or more fields, the configuration file comprising a data structure specifically configured for the application form type, wherein, for a particular field of the one or more fields, the configuration file stores one or more rules for the particular field that describe two or more threshold values for the particular field, each threshold value corresponding to a pixel intensity, the two or more threshold values comprising a completeness threshold value comprising a first pixel intensity and a correctness threshold value comprising a second pixel intensity, and one or more error messages for the particular field to be displayed when a rule for the particular field, a threshold value for the particular field, or both, is not met, the one or more error messages corresponding to a completeness error, a correctness error, or both,
   generate the one or more error messages based on comparing the electronic version with the rule, the completeness threshold value, and the correctness threshold value;
   receive one or more edits to the incomplete application form until the electronic version does not generate an error message, and
   update the electronic version based on the one or more edits received; and
   a display unit in communication with the processing unit, the display unit configured to:
   display the electronic version on a user interface,
   superimpose the one or more error messages on the electronic version to form a composite view, and
   display the updated electronic version on the user interface.

2. The system of claim 1 further comprising a device, wherein the device comprises the processing unit and the display unit.

3. The system of claim 1 further comprising an imaging unit, the imaging unit configured to capture the image.

4. The system of claim 1 further comprising a database configured for communication with the processing unit, the database configured to store one or more of the image, the electronic version, the one or more error messages, an original application form, a configuration file, a log file.

5. The system of claim 1, wherein the processing unit is further configured to repeat the superimposing and updating steps until the incomplete application form becomes a complete application form.

6. The system of claim 1, wherein the processing unit is further configured to determine the error message:

extract marked content in the one or more fields of the electronic version;
calculate an average optical intensity of the extracted marked content;
compare the average optical intensity with the first pixel intensity to determine a presence or an absence of the completeness error;
retrieve at least one rule and the completeness threshold value from the configuration file for the particular field; and
compare the extracted marked content with the at least one rule and the second pixel intensity with the average optical intensity to determine the presence or the absence of the correctness error.

7. A system for facilitating completion of an application form, the system comprising:
   a processing unit configured to:
   receive an image of an incomplete application form comprising background content, one or more fields, and marked content in the one or more fields,
   extract the background content from the image,
   identify an application form type corresponding to the incomplete application form based on the background content,
   generate an electronic version of the incomplete application form using the image, one or more fields of the electronic version configured to be edited by a user,
   retrieve a configuration file corresponding to the application form type, the configuration file storing information about the one or more fields, the configuration file comprising a data structure specifically configured for the application form type, wherein, for a particular field of the one or more fields, the configuration file stores one or more rules for the particular field that describe two or more threshold values for the particular field, each threshold value corresponding to a pixel intensity, the two or more threshold values comprising a completeness threshold value comprising a first pixel intensity and a correctness threshold value comprising a second pixel intensity, and one or more error messages for the particular field to be displayed when a rule for the particular field, a threshold value for the particular field, or both, is not met, the one or more error messages corresponding to a completeness error, a correctness error, or both,
   extract the marked content from the incomplete application form until the electronic version does not generate an error message,
   update the electronic version based on the marked content extracted, and
   determine the one or more error messages based on the marked content and the configuration file; and
   a display unit in communication with the processing unit, the display unit configured to display through a user interface on the display unit, the one or more error messages superimposed on the electronic version to form a composite view.

8. The system of claim 7, further comprising a device, wherein the device comprises the processing unit, the display unit, and an imaging unit, the imaging unit configured to capture the image.

9. The system of claim 7, wherein the processing unit and the display unit are at different locations and configured for communication with each other over a network.

10. The system of claim 7, wherein the processing unit is further configured to compare the background content against a plurality of original application forms, an original application form having the best match to the background content determining the application form type.

11. The system of claim 7 further comprising a database configured for communication with the processing unit, the database configured to store one or more of the image, the electronic version, the one or more error messages, an original application form, a configuration file, a log file.

12. The system of claim 7, wherein the determining the one or more error messages comprises:
calculating an average optical intensity of the extracted marked content in the one or more fields;
comparing the average optical intensity with the first pixel intensity to determine a presence or an absence of the completeness error;
retrieving at least one rule and the completeness threshold value from the configuration file for the particular field; and
comparing the extracted marked content with the at least one rule and the second pixel intensity with the average optical intensity to determine the presence or the absence of the correctness error.

13. A system for detecting one or more errors in a marked application form, the system comprising:
a processing unit configured to:
identify an application form type based on an image of the marked application form,
generate an electronic version of the marked application form, the marked application form comprising a plurality of fields, using the image, wherein the plurality of fields of the electronic version of the marked application form are editable by a user,
access a configuration file for the application form type, the configuration file comprising information about fields of the application form type, the information comprising one or more rules for each field of the plurality of fields, two or more threshold values for each field of the plurality of fields, each threshold value corresponding to a pixel intensity, the two or more threshold values comprising a completeness threshold value comprising a first pixel intensity and a correctness threshold value comprising a second pixel intensity, and one or more error messages for a particular field to be displayed when a rule for the particular field, a threshold value for the particular field, or both, is not met, the one or more error messages corresponding to a completeness error, a correctness error, or both wherein the two or more threshold values are positively correlated with a number of non-white pixels within the particular field, as defined by the configuration file, and the one or more errors are associated with a field of the plurality,
calculate an optical intensity for each field based on the image, the optical intensity corresponding to a pixel value, and
compare the pixel value with the threshold value of each field to determine a presence or an absence of the one or more errors;
an imaging unit configured to capture the image of the marked application form; and
a display unit configured to displaying, using a display unit, the electronic version such that one or more error messages corresponding to the one or more errors are superimposed on the electronic version.

14. The system of claim 13, further comprising a device, wherein the device comprises the processing unit, the imaging unit, and the display unit.

15. The system of claim 14, wherein the device is a portable device.

16. The system of claim 13, further comprising a memory unit configured to store the configuration file.

17. The system of claim 13, wherein the processing unit is further configured to receive from the user in response to the one or more error messages, an edit to the electronic version of the marked application form, the edit comprising an adjustment to the pixel value of the field.

18. The system of claim 13, wherein the processing unit is further configured to extract marked content from the plurality of fields, using the processing unit, wherein the pixel value of a field corresponds to the marked content in the field.

19. The system of claim 13, wherein the processing unit is further configured to extract background content from the marked application form, using the processing unit, wherein the application form type is identified based on the background content.

20. The system of claim 13, wherein
the processing unit further configured to:
extract marked content in the plurality of fields of the electronic version;
calculate an average optical intensity of the extracted marked content;
compare the average optical intensity with the first pixel intensity to determine a presence or an absence of the completeness error;
retrieve at least one rule and the completeness threshold value from the configuration file for the particular field; and
compare the extracted marked content with the at least one rule and the second pixel intensity with the average optical intensity to determine the presence or the absence of the correctness error.

* * * * *